W. A. SCHMIDT & L. BRADLEY.
PROCESS OF SEPARATING THE CONSTITUENTS OF LIQUIDS.
APPLICATION FILED JUNE 2, 1914. RENEWED MAR. 24, 1917.
1,232,395.
Patented July 3, 1917.
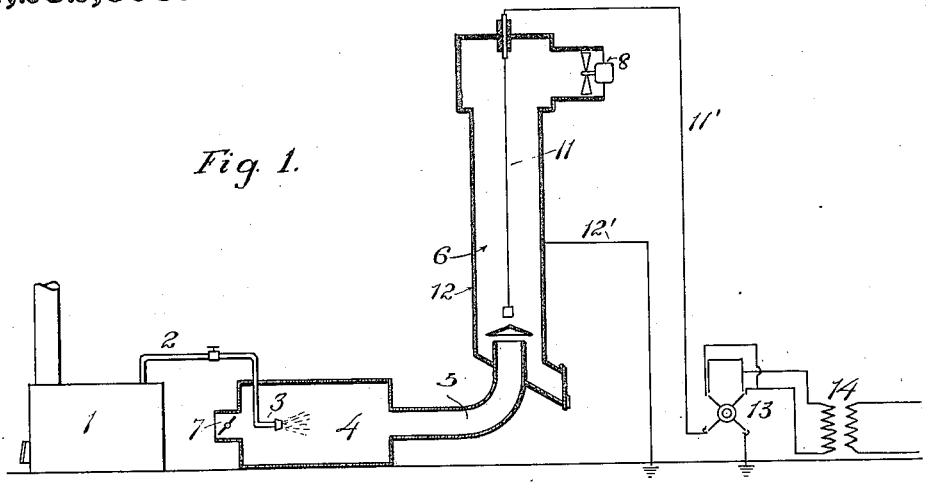
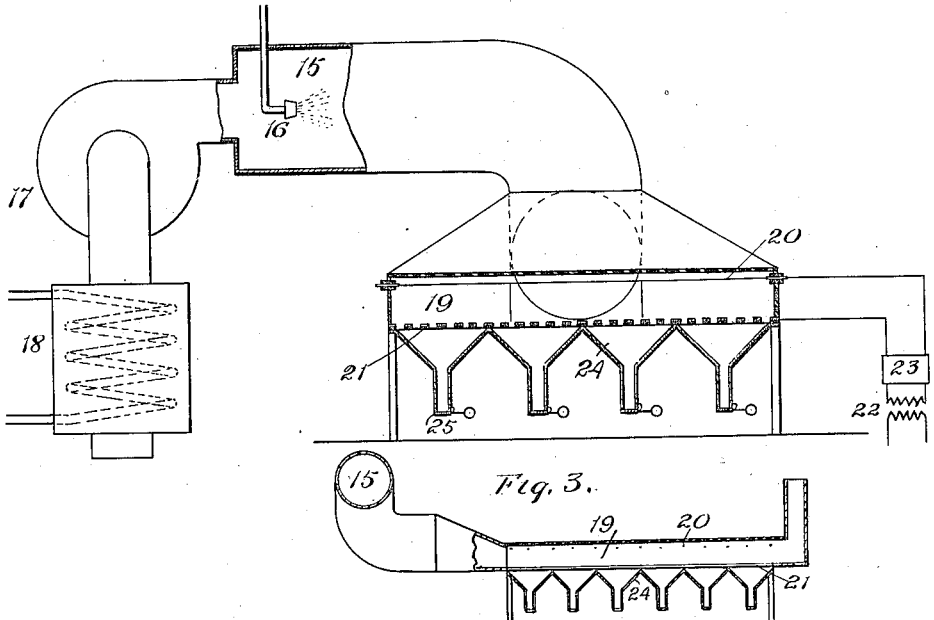
WITNESSES
INVENTORS:
Walter August Schmidt.
Linn Bradley.
BY. Arthur R. Knight
ATTORNEY

UNITED STATES PATENT OFFICE.

WALTER AUGUST SCHMIDT, OF LOS ANGELES, CALIFORNIA, AND LINN BRADLEY, OF EAST ORANGE, NEW JERSEY, ASSIGNORS TO RESEARCH CORPORATION, OF NEW YORK, N. Y., A CORPORATION OF NEW YORK.

PROCESS OF SEPARATING THE CONSTITUENTS OF LIQUIDS.

1,232,395.

Specification of Letters Patent.    Patented July 3, 1917.

Application filed June 2, 1914, Serial No. 842,412. Renewed March 24, 1917. Serial No. 157,262.

*To all whom it may concern:*

Be it known that we, WALTER AUGUST SCHMIDT, residing at Los Angeles, in the county of Los Angeles and State of California, and LINN BRADLEY, residing at East Orange, in the county of Essex and State of New Jersey, have invented a certain new and useful Process of Separating the Constituents of Liquids, of which the following is a specification.

This invention relates, in general to the separation of the more volatile constituents of a liquid from the less volatile constituents thereof, and particularly to the evaporation and drying of material contained in solution or emulsion in liquids.

The main object of the present invention is to provide for evaporation or separation of the liquid from the solid material, with great rapidity and effectiveness and at minimum cost.

There are a large number of instances in the industries, in which it is desired to evaporate certain liquids, particularly solutions, in which the usual methods are attended with inconvenience and difficulties. The ordinary method of evaporating liquids or recovering material in solution, by the evaporation of a solvent, consists in bringing the liquid, or solution, in contact with a hot surface, *e. g.*, the surface of evaporating pans, stills, tubular evaporators, drum evaporators, film evaporators, etc. This method is open to the objection that the materials held in solution are deposited on the evaporating surfaces, in the form of scales or incrustations, which interfere with the drying operation and which have to be removed, at great expense and inconvenience. In case the material which it is desired to recover, or separate, from the solution is of such nature as to be injured by being brought in contact with hot surfaces, this method of drying is especially objectionable, and this objection is particularly important in the case of liquids, such as milk, containing albumin, which is liable to coagulate under the action of heat, and thereby change the chemical and physical characteristics of the product.

One method which has been proposed for drying organic materials, such as described, consists in injecting the solution, in the form of a finely divided spray, into a current of warm dry air, the particles of the spray then instantly losing their moisture by evaporation, and the dissolved material being then carried by the air in the form of suspended particles. This method has not proved successful, however, as the methods heretofore in use for the recovery of these suspended particles have not been such as to make this method of drying commercially or economically successful. It has been attempted to collect the material by gravitative settling in large chambers, but such chambers must be built unduly large, and even then they only effect a partial recovery of the material. The same is true of apparatus using centrifugal force for the separation of the particles from the gas in which they are suspended. The use of filters is not practical as the material rapidly clogs the filters and renders them useless.

We have found that rapid, effective and economical evaporation of solutions may be carried out by first bringing them into a state of fine atomization, so as to cause instantaneous evaporation of the liquid and to leave the residue in the condition of fine particles suspended in a gaseous medium, and then passing the gas with the suspended particles therein, through a chamber in which a silent or glow discharge is maintained, between discharge and collecting electrodes, thereby causing the particles to become charged and to migrate under the action of the electric field, so as to be collected on or adjacent to said collecting electrodes.

Our invention is not limited to any specific method of atomizing the solution, or to any particular apparatus for producing the electric field for collecting the particles.

The accompanying drawing illustrates apparatus suitable for carrying out our invention, and referring thereto:

Figure 1 is a vertical section of an apparatus suitable for evaporation of solutions with which high temperatures may safely be used.

Fig. 2 is a vertical section of an apparatus suitable for use with solutions or liquids requiring the use of low temperatures, and Fig. 3 is a section at right angles to Fig. 2.

In applying our invention to the evaporation of solutions containing substances, such as minerals, which are not injured by high temperatures, we prefer to heat the solution, under great pressure, to a high temperature, and then inject the heated solution into a chamber at greatly reduced pressure, so that the solution is sprayed or atomized into small particles, and the temperature of these particles being above the boiling point as determined by the pressure in the chamber, a portion of the solvent liquid is evaporated, until a condition of equilibrium is attained. The residue of each particle will then be suspended in the gas in the chamber, and may be carried along with such gas so as to be subjected to the electrical precipitating action.

Referring to Fig. 1, the apparatus therein shown comprises a boiler or heater 1, an outlet pipe 2 leading from said boiler to a spray nozzle 3 in an expansion and evaporation chamber 4, and a conduit 5 leading from said chamber 4 to the electrical precipitating chamber 6. A valved inlet 7 may be provided for chamber 4, to admit air or other gas for aiding in the evaporation and carrying forward of the material, and a blower or ejector 8 may be provided at the outlet of the precipitating means 6 to maintain a current of gas through the apparatus. The precipitating means comprises a discharge electrode 11 and collecting electrode 12, here shown as the wall of chamber 6. Connection is made by wires 11' and 12' from the respective electrodes 11 and 12 to a rectifier 13, which receives and rectifies alternating current from a step up transformer 14, supplied with alternating current from any suitable source.

The solution to be evaporated, which may, for example, be brine or other mineral solution, is heated in boiler 1 to a temperature far above its boiling point for atmospheric pressure, the solution being maintained at such pressure as to prevent boiling thereof. The chamber 4 being maintained at a much lower pressure, for example at atmospheric pressure or less, the solution issues with great velocity from nozzle 3, and is thereby atomized, and a portion of each particle of the solution passes into the state of vapor or gas, by reason of the excess of temperature therein over the boiling point for the pressure in chamber 4. A cloud or mist of particles, each containing the solid residues of a particle of the solution is thereby formed, these particles being suspended in the vapor or gas resulting from the evaporation of the solution, along with any air or other gas that may be admitted at the inlet 7. As the current of gas with the particles suspended therein, passes forward into the precipitating chamber 6, and between the electrodes 11 and 12, the particles suspended therein are charged by electrical action at the discharge electrode 11 and driven toward the electrode 12, upon which the suspended matter is collected. In case only partial evaporation or concentration is obtained by the described operation the resulting concentrated fluid will run down the electrodes 12 to any suitable receiver. By this method the solution may be concentrated to any desired degree by maintaining proper relations of temperature and pressure in the boiler and expansion chamber, and by repeating the operation, evaporation to dryness may be effected.

Evaporation to dryness at one operation may be secured, either by maintaining a sufficiently low pressure in the expansion chamber, or by supplying a current of hot dry air or other gas, into which the spray issues, in chamber 4. In the former case, the remaining suspended particles will be carried forward by the evaporated solvent. In the latter case, the particles will be carried forward both by the product of evaporation and by the air or other permanent gas supplied as a carrying medium.

In drying organic matter held in solution, as for example, fruit juices, milk, etc., it is imperative that the solvent be evaporated and the material dried at a low temperature, and in such case the apparatus shown in Figs. 2 and 3 may be used. In these figures, 15 indicates an evaporating chamber, into which the solution is sprayed from a nozzle 16, and 17 represents a blower which forces warm air from a heater 18 through the chamber 15 and through the precipitating chamber 19, containing discharge electrodes 20 and collecting electrodes 21. Suitable electric supply connections, including transformer 22 and rectifier 23 are provided for maintaining the required potential difference between electrodes 20 and 21. The collecting electrodes 21 are placed over collecting boxes or hoppers 24, and suitable means such as discharge gates 25 may be provided for drawing off the collected material.

The milk or other fluid may be heated if desired, precaution being taken not to heat either the liquid or the air supply to a temperature sufficient to injure the material which it is desired to recover from the liquid. The liquid to be evaporated is sprayed into chamber 15 and sufficient warm air is forced through chamber 15 by blower 17 to evaporate the liquid in the particles of spray, with the result that the solid matter in such particles is left in the form of fine particles suspended in the gas consisting of the air and the product of evaporation of the liquid. The current of air advancing from the chamber 15 into the precipitating chamber 19, carries the suspended particles between the electrodes 20 and 21 in said chamber 19, and said particles are then precipitated or collected in said chamber in the same manner as above described.

Drying of materials in the manner above described has the advantage, not only of obviating the difficulties encountered in drying on surfaces, but also of producing the dried material in a state of extremely fine division, thereby dispensing with the necessity of grinding the material after drying.

These two examples of the invention are merely illustrative and our invention is capable of many other applications. For example, it may be desired to recover the distillate, as well as, or instead of, the residue after evaporation. Thus by applying the above described process to the manufacture of aromatic or other spirits, the vapor or gas passing off after precipitation of the solid particles is condensed by any suitable means, the process being otherwise carried out as above described, so that the resulting distillate is, by this process purified from solid matters carried thereby. This method may also be used for separating various constituents of a complex liquid, such as petroleum. In this case the apparatus shown in Fig. 1 may be used with the addition of a condenser at the outlet of the precipitating chamber 6. As the petroleum issues in the form of a spray from nozzle 3, the more volatile constituents are evaporated, leaving the other constituents in the form of particles suspended in the evaporated constituents, so that the subsequent electrical precipitation in chamber 6 effects a separation between these constituents of different volatility. In this manner separation of constituents, having boiling points close together may be made much more quickly and effectively than is possible with the present standard method of distillation.

An important advantage of the above described method wherein the particles are precipitated by the action of an electric field is that the evaporative action is accelerated and rendered more complete by reason of the rapid movement of the particles under the influence of the electric field through the gas in which they are suspended, this rapid movement of the particles relative to the gas tending to present the particles to new portions of gas and to break up the saturated zone which tends to form at the surface of each particle. While the electrical precipitating action is quite rapid, it is also true that the evaporative action is very rapid provided that the particles can be exposed to the fresh dry gas, and this is effected by the rapid transmission of the particles through the gas by the electrical action, thereby aiding materially in drying the particles and insuring their complete drying in a manner which would not be practicable with mechanical methods of precipitation. The electrical precipitation as applied in this connection also has further advantages in doing away with the back pressure incident to the use of bag filters and in enabling the evaporation to take place under steady conditions of temperature and pressure in a manner which would not be possible in either bag filtration or settling in chambers.

What we claim is:

1. The method of separating one portion of a liquid or solution, from another portion thereof, of different volatility, which consists in spraying said liquid to a condition of fine division, causing a portion of each particle of the spray to become evaporated, leaving the residue in the form of particles suspended in a gaseous medium, and subjecting the particles while so suspended, to the action of an electrical discharge, in such a manner as to cause precipitation of the said particles.

2. The method of concentrating liquids, which consists in spraying the liquid to a condition of fine division, into a gaseous medium, causing a portion of each particle of the spray to become evaporated, so as to leave a residue in the form of particles of greater concentration, suspended in said gaseous medium, and subjecting the gaseous medium with the particles suspended therein to the action of an electric field, to cause precipitation of the suspended particles.

3. The method of recovering material from solution, which consists in spraying the solution into a current of gas, in such manner that the solvent is evaporated and the dissolved materials form fine particles suspended in the gas, and then passing the current of gas containing the suspended particles through an electric field in which an electric discharge is maintained, to cause precipitation of the particles from the gas.

4. The method of separating one portion of a complex liquid from another, which consists in spraying the liquid into a body of gas, under such conditions of temperature and pressure as to produce evaporation of the more volatile portion of each particle of the spray, then passing the gas along with the residual particles suspended therein, through an electric field in which an electric discharge is maintained, so as to separate such particles from the gas and from the more volatile portions aforesaid, and then condensing said more volatile portions.

5. The method of concentrating liquids, which consists in spraying the liquid into a current of heated gas; causing a portion of each particle of the spray to become evaporated, so as to leave a residue in the form of particles of greater concentration, suspended in said gas, and subjecting the gas, with the particles suspended therein, to the action of an electric field, to cause precipitation of the suspended particles.

6. The method of treating liquids, which consists in converting the liquid to a condition of vapor carrying suspended particles, and passing the mixture through an electric field to precipitate the suspended particles.

7. The method of recovering material from solution, which consists in introducing the solution in a finely-divided condition into a current of gas, in such manner that the solvent is evaporated and the dissolved materials form fine particles suspended in the gas, and passing the current of gas containing the suspended particles through an electric field to precipitate the particles from the gas.

8. The method of separating one portion of a complex liquid from another, which consists in introducing the liquid in a finely-divided condition into a body of gas, under such conditions of temperature and pressure as to produce evaporation of the more volatile portion of each of the resulting particles, passing the gas with the suspended particles through an electric field to separate the particles from the gas and from the more volatile portions, and then condensing said more volatile portions.

9. The method of concentrating liquids, which consists in introducing the liquid in a finely-divided condition into a current of heated gas, causing a portion of each of the resulting particles to become evaporated so as to leave a residue in the form of particles of greater concentration suspended in said gas, and subjecting the gas with the suspended particles to the action of an electric field to precipitate the particles.

10. The method of evaporating solutions, which consists in distributing the solution, in finely-divided condition, in a body of gas, causing evaporation of solvent, and then subjecting the gas containing the residual liquid in finely-divided condition, to the action of an electrical field to precipitate the liquid.

11. The method of separating constituents of liquids, said constituents being of different volatility, which consists in distributing the liquid in finely-divided condition, in a body of gas, causing a more volatile constituent of the liquid to be evaporated, and then precipitating the residual finely-divided material by the action of an electrical field.

WALTER AUGUST SCHMIDT.
LINN BRADLEY.

Witnesses to signature of Walter A. Schmidt:
  WM. N. DREW,
  H. M. MOSHER.

Witnesses to signature of Linn Bradley:
  A. THIEDE,
  J. C. HALE.